US010209774B2

(12) United States Patent
Billington et al.

(10) Patent No.: US 10,209,774 B2
(45) Date of Patent: Feb. 19, 2019

(54) HAPTICALLY-ENABLED SYSTEM WITH BRAKING

(71) Applicant: Immersion Corporation, San Jose, CA (US)

(72) Inventors: Douglas George Billington, Campbell, CA (US); Kaniyalal Shah, Fremont, CA (US); Van Hilton Tran, Milpitas, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/976,251

(22) Filed: Dec. 21, 2015

(65) Prior Publication Data

US 2016/0103492 A1    Apr. 14, 2016

Related U.S. Application Data

(63) Continuation of application No. 13/785,699, filed on Mar. 5, 2013, now Pat. No. 9,218,075.

(60) Provisional application No. 61/721,231, filed on Nov. 1, 2012.

(51) Int. Cl.
 *G06F 3/01* (2006.01)
 *H02P 3/12* (2006.01)
 *G06F 3/041* (2006.01)

(52) U.S. Cl.
 CPC ............. *G06F 3/016* (2013.01); *G06F 3/041* (2013.01); *H02P 3/12* (2013.01)

(58) Field of Classification Search
 USPC ......... 318/114, 671, 74, 520, 560, 128, 451, 318/460; 310/317, 319, 330, 339, 310/316.01; 340/407.1, 7.6, 965; 345/156, 173
 See application file for complete search history.

(56) References Cited

U.S. PATENT DOCUMENTS

| | | | |
|---|---|---|---|
| 4,494,058 A | 1/1985 | Berti | |
| 6,236,177 B1 | 5/2001 | Zick et al. | |
| 6,371,587 B1 | 4/2002 | Chang | |
| 6,646,851 B1 | 11/2003 | Gudat | |
| 7,843,277 B2 * | 11/2010 | Gregorio | G06F 3/016 331/116 R |
| 8,836,199 B2 | 9/2014 | Ide et al. | |
| 2005/0130695 A1 * | 6/2005 | Korhonen | H04M 1/0202 455/550.1 |
| 2006/0017481 A1 * | 1/2006 | Yoshikawa | H01L 41/042 327/170 |
| 2006/0119573 A1 | 6/2006 | Grant et al. | |
| 2007/0202841 A1 * | 8/2007 | Cruz-Hernandez | B06B 1/0215 455/403 |

(Continued)

FOREIGN PATENT DOCUMENTS

CN     101663104 A    3/2010
JP     04-271050 A    9/1992

(Continued)

*Primary Examiner* — Jorge L Carrasquillo
(74) *Attorney, Agent, or Firm* — Medler Ferro Woodhouse & Mills PLLC (57) ABSTRACT

A haptically-enabled system includes an actuator that has a first terminal and a second terminal. The second terminal is coupled to a voltage source, and a first switch is coupled to the first terminal and to ground. A second switch is coupled to the actuator. The second switch is parallel to the actuator.

9 Claims, 5 Drawing Sheets

(56) References Cited

U.S. PATENT DOCUMENTS

| | | | |
|---|---|---|---|
| 2008/0252594 A1* | 10/2008 | Gregorio | B06B 1/0238 |
| | | | 345/156 |
| 2009/0201620 A1 | 8/2009 | Gray et al. | |
| 2009/0295552 A1* | 12/2009 | Shahoian | G06F 3/016 |
| | | | 340/407.1 |
| 2010/0253487 A1* | 10/2010 | Grant | G06F 3/016 |
| | | | 340/407.2 |
| 2012/0229264 A1 | 9/2012 | Bosch et al. | |
| 2012/0232780 A1 | 9/2012 | Delson et al. | |
| 2012/0319627 A1 | 12/2012 | Rottmerhusen | |
| 2013/0002411 A1* | 1/2013 | Henderson | H02N 2/005 |
| | | | 340/407.1 |
| 2013/0033366 A1 | 2/2013 | McDonough et al. | |

FOREIGN PATENT DOCUMENTS

| | | | | | |
|---|---|---|---|---|---|
| JP | 04271050 | A | * | 9/1992 | |
| JP | 1992271050 | A | | 9/1992 | |
| JP | 1993083986 | A | | 4/1993 | |
| JP | 07-147767 | A | | 6/1995 | |
| JP | 08-033389 | A | | 2/1996 | |
| JP | 09-074740 | A | | 3/1997 | |
| JP | 1999069873 | A | | 3/1999 | |
| JP | 2006-042477 | A | | 2/2006 | |
| JP | 2006042477 | A | * | 2/2006 | H01L 41/042 |
| JP | 2006-222826 | A | | 8/2006 | |
| JP | 2006222826 | A | * | 8/2006 | |
| JP | 2012-146325 | A | | 8/2012 | |
| JP | 2012146325 | A | | 8/2012 | |

* cited by examiner

Fig. 5

HAPTICALLY-ENABLED SYSTEM WITH BRAKING

CROSS REFERENCE TO RELATED APPLICATIONS

This application is a continuation of U.S. patent application Ser. No. 13/785,699, filed on Mar. 5, 2013 and issued as U.S. Pat. No. 9,218,075, which claims priority of U.S. Provisional Patent Application Ser. No. 61/721,231, filed on Nov. 1, 2012, the disclosures of which are hereby incorporated by reference.

FIELD

One embodiment of the present invention is directed to an actuator. More particularly, one embodiment of the present invention is directed to a drive circuit for an actuator used to create vibrations on a haptically-enabled device.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, smartphones, portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Further, devices such as smartphones use haptic effects to cause "buttons" on a touchscreen to feel like their mechanical counterparts when selected by a user.

In order to generate vibration effects, many devices utilize some type of actuator or haptic output device. Known actuators used for this purpose include an electromagnetic actuator such as an Eccentric Rotating Mass ("ERM") actuator in which an eccentric mass is moved by a motor. Typically, an ERM requires a bidirectional signal (i.e., an alternating positive voltage and negative voltage signal) in order to create a braking effect, which provides for a crisper dynamic signal. However, most portable electronic devices generate direct current only, so a special drive circuit is required to generate the bidirectional signal. The typical circuit includes an H-bridge, which is a circuit that includes four transistors/switches. However, for portable devices, cost is an important driving factor, and the cost of four switches may be disproportionally high relative to the total cost of the device.

SUMMARY

One embodiment is a haptically-enabled system that includes an actuator that has a first terminal and a second terminal. The second terminal is coupled to a voltage source, and a first switch is coupled to the first terminal and to ground. A second switch is coupled to the actuator. The second switch is parallel to the actuator.

DETAILED DESCRIPTION

One embodiment is a drive circuit that provides a programmable shorting load across an actuator/motor. The activation of the shorting load when the actuator is spinning brakes the actuator by stopping the spinning after a relatively short time duration without the need to apply a reverse polarity voltage.

Figure 1:
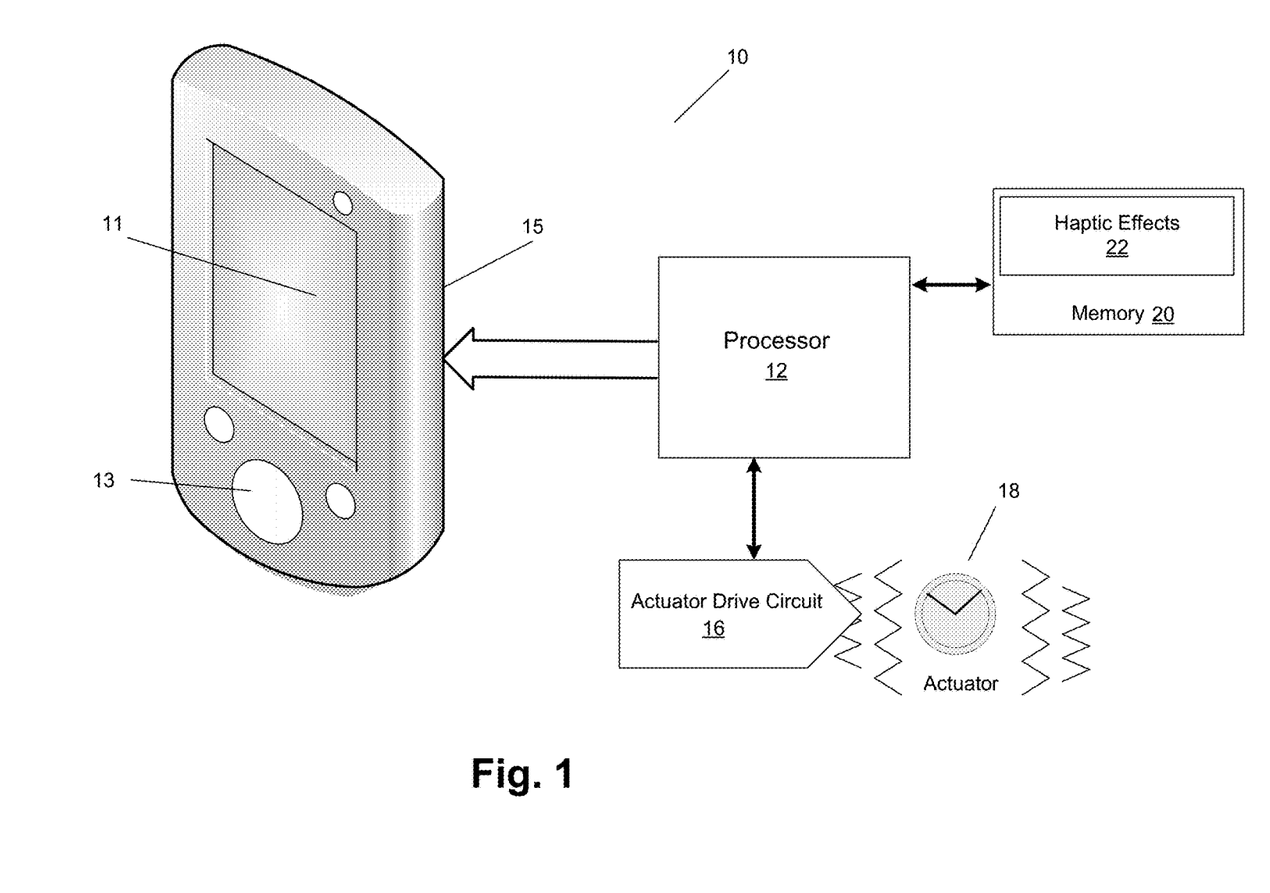
FIG. 1 is a block diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor or controller 12. Coupled to processor 12 is a memory 20 and an actuator drive circuit 16, which is coupled to an actuator 18. Actuator 18 can be any type of Direct Current ("DC") motor, and in one embodiment is an Eccentric Rotating Mass ("ERM") actuator. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects with braking, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, etc., or may be any other type of device that includes a haptic effect system that includes one or more actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different rotational capability in order to create a wide range of haptic effects on the device.

Figure 2:
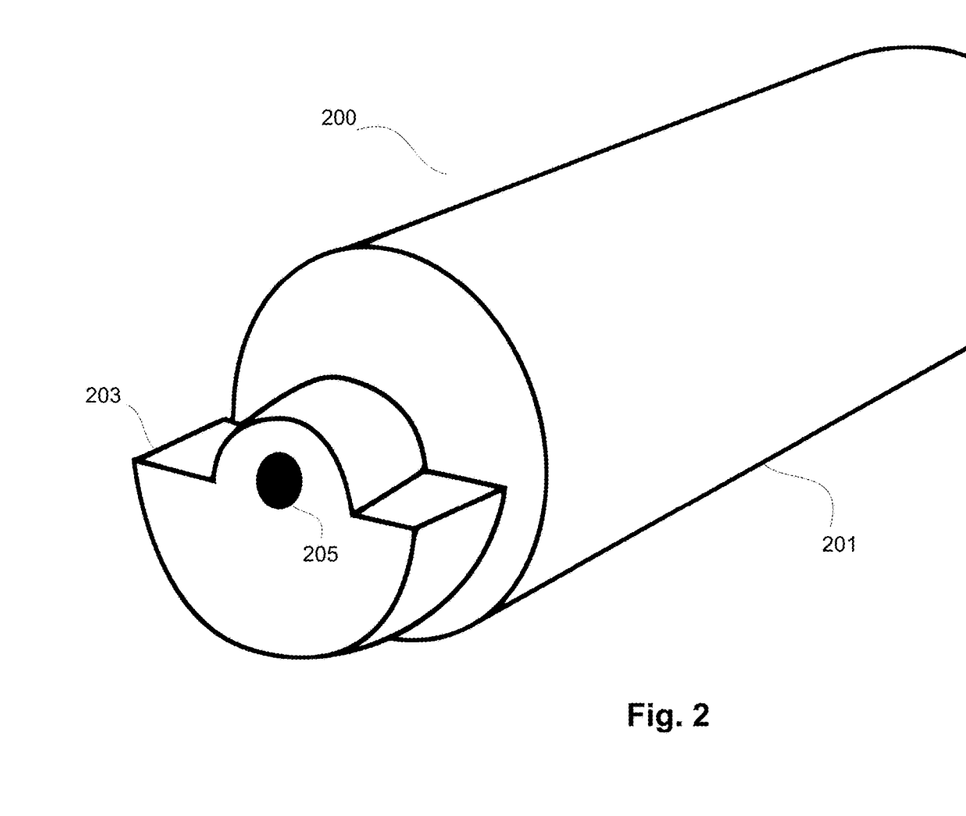
FIG. 2 is a partial perspective view of an ERM embodiment of the actuator of FIG. 1 in accordance with one embodiment of the present invention.

FIG. 2 is a partial perspective view of an ERM embodiment of actuator 18 of FIG. 1 in accordance with one embodiment of the present invention. ERM 200 includes a rotating mass 201 having an off-center weight 203 that rotates about an axis of rotation 205. In operation, any type of motor may be coupled to ERM 200 to cause rotation in one or both directions around axis of rotation 205 in response to the amount and polarity of voltage applied to the motor across two leads of the motor (not shown in FIG. 2). An application of voltage at one polarity will have an acceleration effect and cause the ERM 200 to increase its rotational speed in one direction, and an application of voltage in the opposite polarity will have a braking effect and cause the ERM 200 to decrease or even reverse its rotational speed in the opposite direction. However, as discussed above, the drive circuit required to apply a bi-directional signal/voltage to achieve haptic effect braking typically includes a relatively expensive H-bridge.

Figure 3:
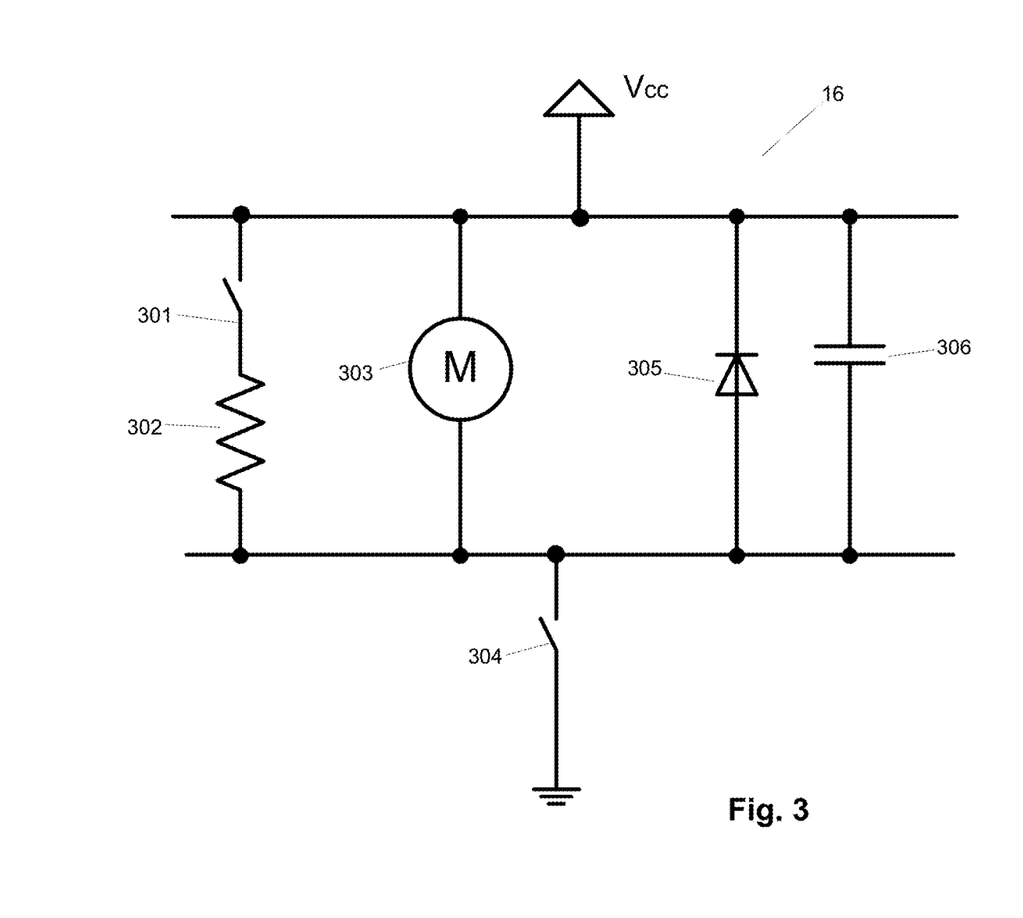
FIG. 3 is a circuit diagram of an actuator drive circuit in combination with the actuator of FIG. 1 in accordance with an embodiment of the present invention.

FIG. 3 is a circuit diagram of actuator drive circuit 16 in combination with actuator 18 of FIG. 1 in accordance with an embodiment of the present invention. In circuit 16, a DC motor 303 is coupled on one terminal to ground through a first switch 304 and coupled on the other terminal to the voltage of the circuit (i.e., "$V_{cc}$"). Motor 303 can be actuator 18, and in one embodiment is an ERM actuator. In parallel to motor 303 is a second switch 301 and a resistor 302. Resistor 302 is optional and provides a safety function of protecting switches 301, 304 if both were turned on at the same time, which would cause a direct short circuit current path from $V_{cc}$ thru switches 301, 304 to ground. The functionality of resistor 302 can also be incorporated into switch 301 so it is not a separate component. In one embodiment, both switches 301 and 304 are bi-polar or metal-oxide-semiconductor field-effect transistor ("MOSFET") transistors.

Circuit 16 further includes a diode 305 and a capacitor 306 in parallel to motor 303. Diode 305 and capacitor 306 suppress spikes on motor 303 and are also optional components.

The value of resistor 302 is a tradeoff between motor braking current and switch safety precautions. The reverse voltage of diode 305 and the rated voltage of capacitor 306 in one embodiment are greater than the operational voltage of motor 303 plus the amplitude of any back electromotive force ("EMF") spikes created. The forward voltage of diode 305 can be a wide range (e.g., 0.2V or 0.7V), and capacitor 306 is non-polarized in one embodiment.

In operation, first switch 304 and second switch 301 are normally open and in this condition motor 303 does not spin. Motor 303 is turned on and begins spinning when switch 304 is closed. By keeping switch 304 continuously closed, motor 303 will eventually reach a peak speed to create one type of haptic effect. Switch 304 can be opened and closed and repeated to achieve a duty cycle of motor 303 to create other types of haptic effects.

When motor 303 is to be braked, first switch 304 is opened, and after a short pause to prevent both switches from being closed at the same time (e.g., one or two microseconds), second switch 301 is closed. This causes motor 303 to brake, and when motor 303 stops moving, switch 304 is opened, and then switches 304 and 301 can remain open.

In another embodiment, instead of a first motor terminal coupled to a voltage source and the second motor terminal coupled through a switch to ground, as shown in FIG. 3, an inverse configuration can be implemented. Specifically, in this embodiment, a first motor terminal is coupled to ground and a second motor terminal is coupled through a switch to the voltage source.

Figure 4:
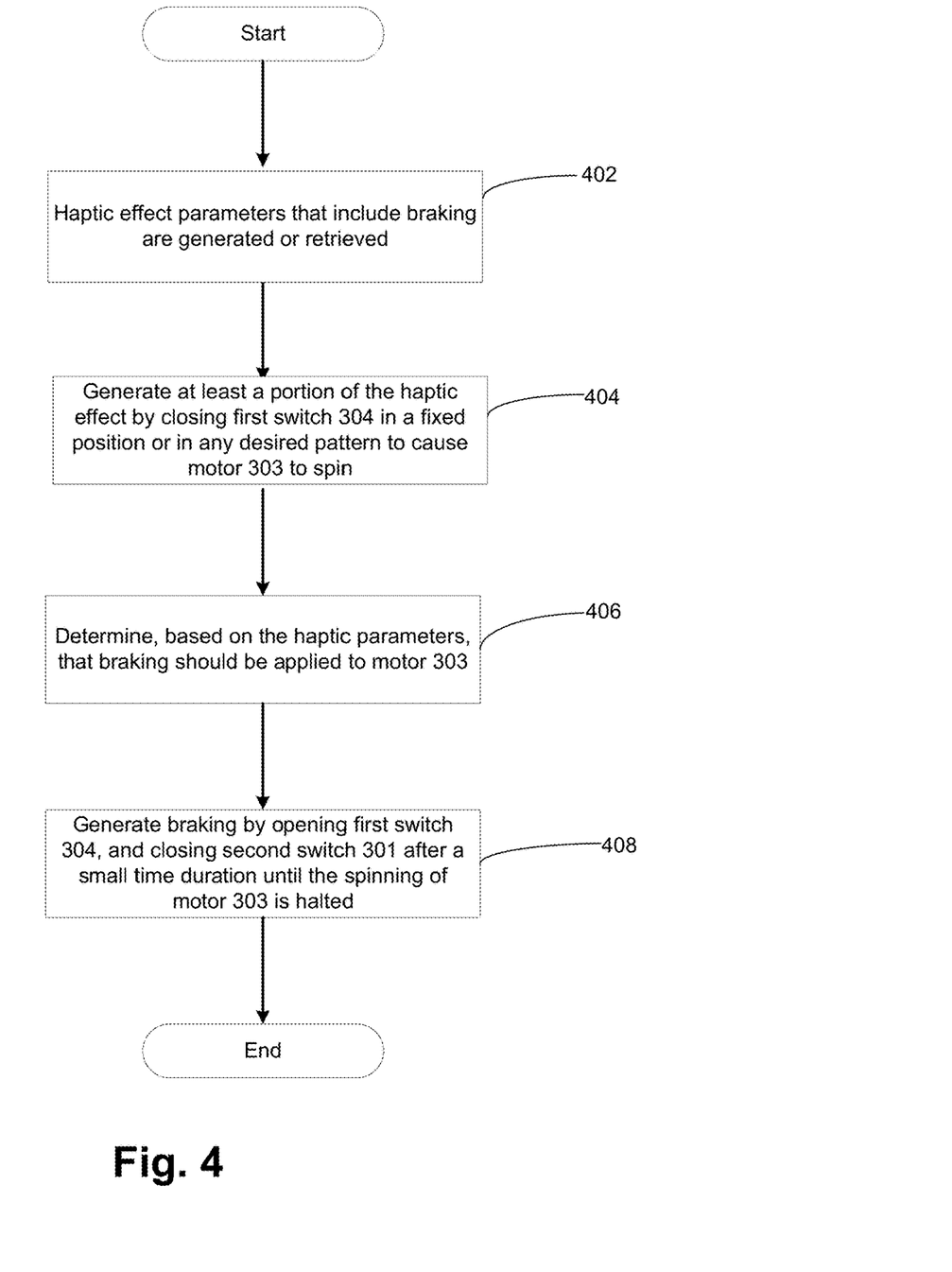
FIG. 4 is a flow diagram of the functionality of the system when providing haptic effects with braking in accordance with one embodiment of the present invention.

FIG. 4 is a flow diagram of the functionality of system 10 when providing haptic effects with braking in accordance with one embodiment of the present invention. In one embodiment, the functionality of the flow diagram of FIG. 4 is implemented by software (e.g., haptic effects module 22) stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, haptic effect parameters that include braking are generated or retrieved from memory or another source. The parameters may include high level parameters that define a particular haptic effect, such as magnitude, frequency and duration, or may be formed of low level parameters such as motor voltages. The braking typically provides a crisp feeling and can be used, for example, to simulate a mechanical key when a user touches a touchscreen implemented key.

At 404, at least a portion of the haptic effect is generated by closing first switch 304 in a fixed position or in any desired pattern to cause motor 303 to spin.

At 406, it is determined, based on the haptic parameters, that braking should be applied to motor 303.

At 408, to generate the braking, first switch 304 is opened, and second switch 301 is closed after a small time duration until the spinning of motor 303 is halted. The closing of switch 301 adds a "shorting load" across motor 303.

Figure 5:
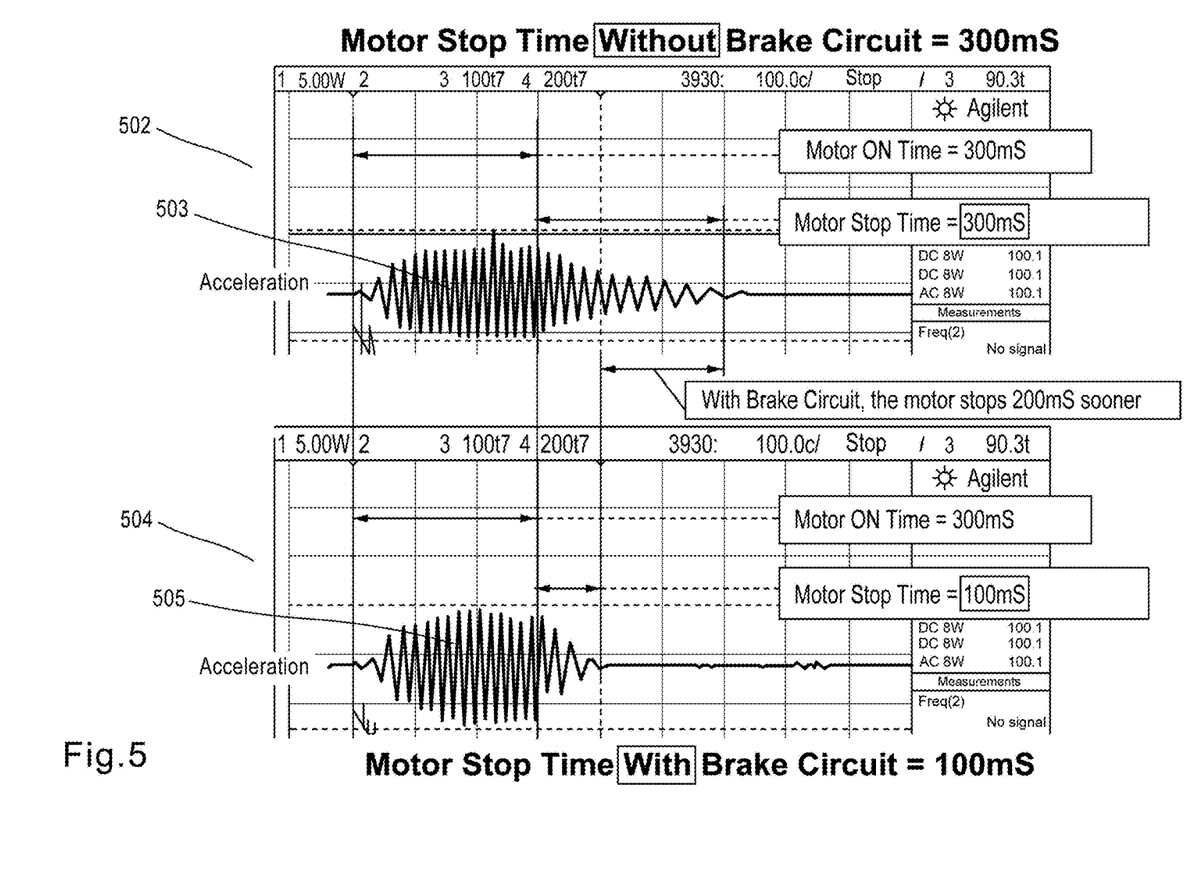
FIG. 5 illustrates two graphs of acceleration vs. time for a haptic effect.

As discussed, embodiments provide braking on an actuator without the need for bi-directional signals or an H-bridge circuit. FIG. 5 illustrates two graphs 502 and 504 of acceleration vs. time for a haptic effect. Graph 502 is a prior art graph of a haptically-enabled system without circuit 16 of FIG. 3. Graph 504 is a graph of a haptically-enabled system with circuit 16 (i.e., the "brake circuit") in accordance with embodiments of the present invention. As shown by an acceleration curve 503 of graph 502, without the braking circuit, after spinning for 300 ms, the motor takes 300 ms to stop. In comparison, as shown by an acceleration curve 505 of graph 504, with the braking circuit (i.e., circuit 16) in accordance with embodiments of the present invention, after spinning for 300 ms, the motor only takes 100 ms to stop.

As disclosed, embodiments cause a DC motor to brake by applying a shorting load across the motor, which stops the spinning of the motor after a relatively short time duration. Therefore, haptic effects with braking can be effectively generated without the need for bi-directional voltages.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating a haptic effect comprising:
   receiving haptic effect parameters comprising a braking haptic effect parameter and a non-braking haptic effect parameter;
   applying a direct current (DC) voltage having a first polarity to a terminal of a DC motor actuator that is coupled to an actuator drive circuit, wherein the DC voltage is equal to a power supply voltage of a power supply coupled to the DC motor actuator;
   while the DC voltage having the first polarity is being applied to the terminal of the DC motor actuator, applying a first signal to the actuator drive circuit to correspond to the non-braking haptic effect parameter, wherein, after the first signal is applied to the actuator drive circuit, the DC voltage causes the DC motor actuator to rotate to generate the haptic effect; and
   while the DC voltage having the first polarity is still being applied to the terminal of the DC motor actuator, applying a braking signal to the actuator drive circuit to correspond to the braking haptic effect parameter, wherein the braking signal causes the actuator drive circuit to create a short circuit across the DC motor actuator in order to cause the DC motor actuator to be braked, such that the DC motor actuator is braked without applying thereto any voltage having a second polarity that is in reverse to the first polarity.

2. The method of claim 1, wherein the DC motor actuator comprises an Eccentric Rotating Mass (ERM) coupled thereto.

3. The method of claim 1, wherein applying the braking signal causes a first switch to open and a second switch to close.

4. The method of claim 1, further comprising:
   in response to applying the first signal, closing a first switch while opening a second switch to cause the DC motor actuator to rotate to generate a first portion of the haptic effect; and
   in response to applying the braking signal, opening the first switch and closing the second switch to cause the DC motor actuator to stop rotating, wherein the second switch provides the short circuit across the DC motor actuator, and wherein the first switch and the second switch are part of the actuator drive circuit.

5. The method of claim 4, wherein:
   the terminal is a first terminal directly coupled to a voltage source provided by the power supply;
   the first switch has a first switch first side directly coupled to a second terminal of the DC motor actuator and has a first switch second side directly coupled to ground; and
   the second switch has a second switch first side directly coupled to the first terminal of the DC motor actuator, wherein the second switch is parallel to the DC motor actuator.

6. A non-transitory computer readable medium having instructions stored thereon that, when executed by a processor, cause the processor to generate a haptic effect by:
   receiving haptic effect parameters comprising a braking haptic effect parameter and a non-braking haptic effect parameter;
   applying a direct current (DC) haptic effect signal to a DC motor actuator coupled to an actuator drive circuit;
   while applying the DC haptic effect signal, applying a first signal to the actuator drive circuit to correspond to the non-braking haptic effect parameter;
   while applying the DC haptic effect signal, applying a braking signal to the actuator drive circuit to correspond to the braking haptic effect parameter;
   in response to applying the first signal, closing a first switch while opening a second switch to cause the DC motor actuator to rotate to generate a first portion of the haptic effect and in response to applying the braking signal, opening the first switch and closing the second switch to cause the DC motor actuator to stop rotating, wherein the second switch provides a short circuit across the DC motor actuator,
   wherein the DC motor actuator comprises a first terminal and a second terminal, and the short circuit couples the first terminal directly to the second terminal, or couples the first terminal directly to a resistor, wherein the resistor is directly coupled to the second terminal,
   wherein the second terminal is directly coupled to a voltage source;
   wherein the first switch has a first switch first side directly coupled to the first terminal and has a first switch second side directly coupled to ground; and
   wherein the second switch has a second switch first side directly coupled to the second terminal of the actuator, wherein the second switch is parallel to the DC motor actuator.

7. The non-transitory computer readable medium of claim 6, wherein the DC motor actuator comprises an Eccentric Rotating Mass (ERM) coupled thereto.

8. A haptically-enabled system comprising:
   a processor;
   an actuator drive circuit coupled to the processor;
   a direct current (DC) motor actuator coupled to the drive circuit;
   a power supply applying a DC voltage having a first polarity to a terminal of the DC motor actuator, wherein the DC voltage is equal to a power supply voltage provided by the power supply,
   a storage device coupled to the processor;
   wherein the processor, when executing instructions stored in the storage device, generates a haptic effect by:
      receiving haptic effect parameters comprising a braking haptic effect parameter and a non-braking haptic effect parameter,
      while the DC voltage having the first polarity is being applied to the terminal of the DC motor actuator, applying a first signal to the actuator drive circuit to correspond to the non-braking haptic effect parameter, wherein, after the first signal is applied to the actuator drive circuit, the DC voltage causes the DC motor actuator to rotate to generate the haptic effect, and while the DC voltage having the first polarity is still being applied to the terminal of the DC motor actuator, applying a braking signal to the actuator drive circuit to correspond to the braking haptic effect parameter, wherein the braking signal causes the actuator drive circuit to create a short circuit across the DC motor actuator in order to cause the DC motor actuator to be braked, such that the DC motor actuator is braked without applying thereto any voltage having a second polarity that is in reverse to the first polarity.

9. The haptically-enabled system of claim 8, further comprising a first switch and a second switch, wherein the processor is further configured to perform the following:

in response to applying the first signal, closing a first switch while opening a second switch to cause the DC motor actuator to rotate to generate a first portion of the haptic effect; and in response to applying the braking signal, opening the first switch and closing the second switch to cause the DC motor actuator to stop rotating, wherein the second switch provides the short circuit across the DC motor actuator.

* * * * *